United States Patent
Takagi

(10) Patent No.: US 7,075,944 B1
(45) Date of Patent: Jul. 11, 2006

(54) ACCOMMODATION FRAME AND TRANSMISSION DEVICE OF DIFFERENT DATA TRAFFICS ON COMMON CARRIER WAVE

(75) Inventor: Kazuo Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 916 days.

(21) Appl. No.: 09/712,225

(22) Filed: Nov. 15, 2000

(30) Foreign Application Priority Data

Nov. 16, 1999 (JP) ................................ 11-325713

(51) Int. Cl.
*H04J 3/16* (2006.01)

(52) U.S. Cl. ........................................ 370/470; 370/498

(58) Field of Classification Search ................ 370/215, 370/465, 522, 538, 307, 466, 524, 539, 242, 370/243, 244, 248, 503, 509, 535, 514, 498, 370/471, 470, 469, 487, 485, 480, 464, 467, 370/341, 437; 714/158; 455/424, 425, 433, 455/437, 450, 550
See application file for complete search history.

(56) References Cited

U.S. PATENT DOCUMENTS

| | | | |
|---|---|---|---|
| 5,856,988 A | 1/1999 | Kiriyama | 371/41 |
| 5,857,092 A | 1/1999 | Nakamura et al. | 395/500 |
| 5,907,551 A * | 5/1999 | Nishio et al. | 370/395.2 |

(Continued)

FOREIGN PATENT DOCUMENTS

| | | |
|---|---|---|
| EP | 0 909 051 A2 | 4/1999 |
| EP | 0 942 569 A2 | 9/1999 |
| JP | 8-321833 | 12/1996 |
| JP | 9-36875 | 2/1997 |
| JP | 9-93305 | 4/1997 |

(Continued)

OTHER PUBLICATIONS

Takashi Takeshita et al., "Mastering TCP/IP Introductory Edition,", Chapter 3.13, IP Header, Ohm Co., Ed. 1, Jun. 24, 1994, pp. 98-103.

(Continued)

*Primary Examiner*—Hassan Kizou
*Assistant Examiner*—Ricardo Pizarro
(74) *Attorney, Agent, or Firm*—Foley & Lardner LLP

(57) ABSTRACT

A frame for multiplexing multi-traffic frames of layers on a same carrier wave and an apparatus thereof is constituted by an overhead and a payload. The overhead is constituted by: a data length identifier indicating a frame or a payload length; a flow identifier indicating an attribute of the frame; and a frame header overhead error check (FHEC) storing a result obtained by converting bytes from the head to a specified M-th byte of the frame into a numerical value of n bytes according to a certain coding method. A maximum length of the payload is computed from the data length identifier of the overhead. In the payload, traffic for the layers 1 to 3 can be accommodated. Even if the ATM cell and the frame are multiplexed, since coding methods for the FHEC and the HEC are different, the ATM cell and the frame can be extracted individually.

22 Claims, 10 Drawing Sheets

U.S. PATENT DOCUMENTS

U.S. PATENT DOCUMENTS

| | | | |
|---|---|---|---|
| 5,995,171 A * | 11/1999 | Enari et al. | 375/240.27 |
| 6,041,043 A | 3/2000 | Denton et al. | 370/254 |
| 6,377,725 B1 * | 4/2002 | Stevens et al. | 385/24 |
| 6,411,631 B1 * | 6/2002 | Sugawara et al. | 370/465 |
| 6,477,184 B1 * | 11/2002 | Ishikawa | 370/509 |
| 6,522,665 B1 * | 2/2003 | Suzuki et al. | 370/471 |
| 6,697,386 B1 * | 2/2004 | Sugawara et al. | 370/535 |

FOREIGN PATENT DOCUMENTS

JP     2768297     4/1998

JP     10-135986     5/1998

OTHER PUBLICATIONS

Takenori Okutani et al., "ATM Technology for Low Speed Real Time Voice Communications—AAL Type 2 Standardization"—Journal of the Electronic Information Communications Society, vol. 80, No. 10, Oct. 25, 1997, pp. 1043-1049.

IBM Technical Disclosure Bulletin, Packet Delineation Format on High Speed Trunks, Sep. 1995, vol. 38, No. 09.

* cited by examiner

FRAME 800

FIG. 10 (PROPR ART)
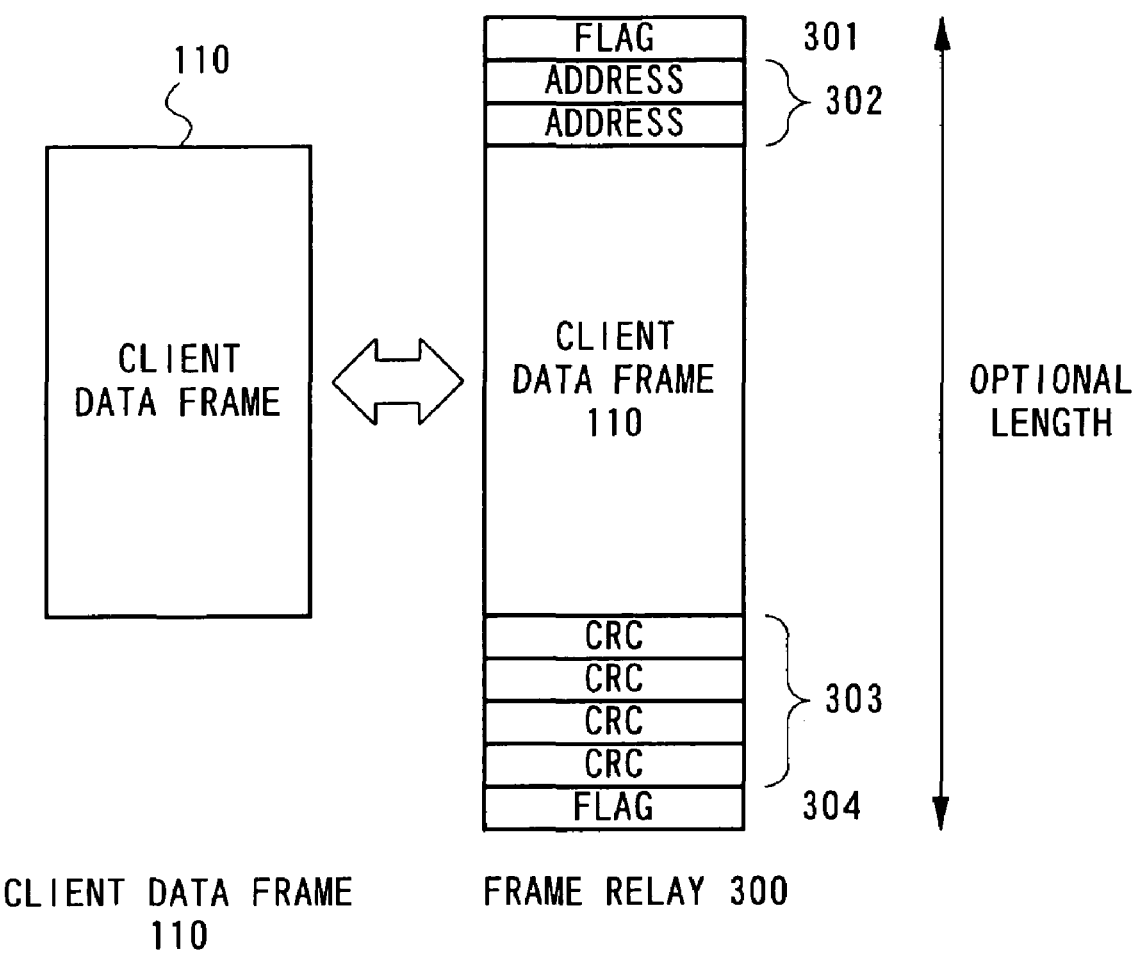

ACCOMMODATION FRAME AND TRANSMISSION DEVICE OF DIFFERENT DATA TRAFFICS ON COMMON CARRIER WAVE

BACKGROUND OF THE INVENTION

1. Field of the Invention

The present invention relates to a technology of multiplexing service traffics of a plurality of layers 1 to 3 on the same carrier wave in a transmission network including a lightwave network.

2. Description of the Related Art

As multimedia communication services such as a transmission of voices and images and a connection to the Internet have been widespread, the demand for a large capacity communication path has increased. A physical infrastructure has been well equipped, and various services suitable for the respective networks have been provided. A transmission system from a service receiver (hereinafter referred to as a "client") has been varied into protocols such as an asynchronous transfer mode (ATM), a frame relay, a point-to-point protocol and a giga-bit ether. Since these protocols do not have compatibilities, they cannot be multiplexed as they are.

As a method of performing a transmission of these protocols by the one and only carrier wave, a method of converting the protocols into one protocol among the protocols to form a common frame and of unifying and processing the entire traffics is conceived.

(Please refer to Japanese Patent Laid-Open No. Hei 8-321833, Japanese Patent Gazette No. 2768297, Japanese Patent Laid-Open Nos. Hei 10-135986, 9-93305 and 9-36875.) FIG. 8 to FIG. 10 show the cases where ATM is used as a common frame and a frame relay is used as the common frame.

FIG. 8 shows the conventional processing system used when a client data frame 110 is transferred as an ATM cell 130 by use of an A™ adaptation layer type 5 (AAL5). This system is standardized according to "Multiprotocol Encapsulation over ATM Adaptation Layer 5" of IETF RFC 1483 (Juha Heinanen, Telecom Finland, July 1993).

An AAL5 frame 120 is constituted by adding the following bytes at the rear of the client data frame 110. Specifically, eight bytes of a new overhead which includes a CPCS-PDU Length information area 122 (two bytes) indicating a size of the client data frame 110 and a CRC information area 121 (four bytes) for error check are added, and a padding area 125 which adds zero to forty seven bytes so that the size (bytes) of the AAL5 frame 120 can be a multiple of forty eight bytes is added.

With the AAL5, the AAL5 frame 120 is split into each forty eight bytes 131, and five bytes of a common overhead 132 is added to each forty eight bytes 131, thus a plurality of ATM cells 130 are generated. In this case, only a final ATM cell 130-n is clarified as a final cell of the AAL5 frame 120 by turning a bit located at a lowest position of a PTI field in an overhead 132-n into one. Then, the ATM cells 130 are mapped into payload portions of the respective media.

FIG. 9 shows a state, as an example, where one of the ATM cells is mapped into a SONET payload portion. A SONET is constituted of a SONET overhead (SOH) 210 and a SONET payload 220, and the ATM cell 130 is mapped into the SONET payload 220 in such forms shown in signal blocks 221.

A node shown in FIG. 9, which has received a carrier wave such as the SONET refers to the overhead 132 after extracting the ATM cell 130. If the ATM cell 130 is an ATM connection to be terminated, the ATM cell 130 is managed for every ATM connection. In the node, when the ATM cell 130-n having the lowest position bit value of one is received, the overhead 132 is deleted from the ATM cell 130, and the rest thereof is converted into the AAL5 frame 120. Thereafter, the client data frame 110 is reconstructed.

In such a manner, various client data frames can be multiplexed on the same carrier wave by use of the ATM, and a desired client data frame transfer can be realized between clients transmissively.

FIG. 10 shows the conventional processing example where a frame relay 300 is used as a common frame. The frame relay 300 imparts two bytes of an address information area 302 to the head of the client data frame 110, and imparts four bytes of an error check information area 303 at the rear of the client data frame 110. Thus, data is constituted.

To the head and the rear of the data thus constituted, flags 301 and 304, each of which has one byte of the information area, are imparted to encapsulated, thus the frame relay 300 is constituted. The frame relay 300 thus constituted is mapped as the signal blocks 221 into the payload 220 similarly to the ATM cell 130 as shown in FIG. 9. The node having received a row of such signals as shown in FIG. 9 extracts the frame relay 300 by detecting the flags 301 and 304.

Thereafter, the address information area 302 is referred. And hence, if the frame relay 300 is the one to be terminated, the flags 301 and 304, which serve as the overheads of the frame relay 300, the address information area 302, the error check information area 303, are deleted to return the frame relay 300 into the client data frame 110. When the frame relay 300 is constituted, byte insertion is performed so that patterns of the flags 301 and 304 cannot exist within the frame relay 300.

As described above, various client data frames can be multiplexed on the same carrier wave by use of the frame relay, and a desired client data frame transfer can be realized between clients transmissively.

In the case where the ATM cell is used as a common frame as described above, since the overhead having fifty-six bytes at maximum is added for constructing the AAL5 frame, an amount of the overhead is increased. Moreover, in the case of the ATM cell, since it is necessary to split the AAL5 frame into forty eight bytes of the ATM cells, which are small, and to add overheads thereto, there has existed a problem that 10% or more of a band is used.

Moreover, in the case where the AAL5 frame is reconstructed by a receiver, a group of cells of the same connection must be split to be managed. Accordingly, in the case where the receiver has to deal with many connections, there is a fear that an operation speed may be limited.

Furthermore, in the case where the frame relay is used as the common frame, since the byte insertion must be performed so as not to cause the same pattern as those of the flags in the frame, there is a fear that a transfer frame length may be extended almost twice in some cases, leading to a low efficiency.

Still further, in the case where the frame relay is used as the common frame, the ATM cell is also encapsulated. This results in a further addition of a overheads to the ATM cell, leading to a significantly lower efficiency.

The object of the present invention is to provide a technology of multiplexing data traffics of layers 3 or more including an IP packet and a plurality of layer 2 frames such as an ATM, a PPP, an Ether and an STM on a same carrier wave efficiently.

SUMMARY OF THE INVENTION

The frame of the present invention is a frame used in a network, which connects a plurality of different client apparatuses, concentrates client data frames transferred from the client apparatuses to multiplex the same on a same carrier wave, separates the client data multiplexed on the same carrier wave, and transfers the client data frames to client apparatuses opposite to the client apparatuses transmissively, and comprises: a data length identifier indicating a data length; an information area of a flow identifier indicating classification, quality or a channel of a client data traffic; a frame header error check (hereinafter, referred to as "FHEC") area, that is an area of n bytes (n: a plus integer) from M plus 1-th byte, which stores a result Y having n bytes or less, the result Y being obtained by computing a numerical value X from the head to a predetermined M-th bytes (M: a plus integer); and a payload area having a variable length, which stores client data frames.

Another frame of the present invention is a frame used in a network, which connects a plurality of different client apparatuses, concentrates client data frames transferred from the client apparatuses to multiplex the same on a same carrier wave, separates the client data multiplexed on the same carrier wave, and transfers the client data frames to client apparatuses opposite to the client apparatuses transmissively, the frame comprising: a data length identifier indicating a data length; an information area of a flow identifier indicating classification, quality or a channel of a client data traffic; an FHEC area, that is, an area of n bytes from M plus 1-th byte, which stores a result Y having n bytes (n: a plus integer) or less, the result Y being obtained by computing a numerical value X from the head to a predetermined M-th bytes (M: a plus integer); a payload area having a variable length, which stores client data frames; and an error detection area performing an error check.

The error detection area of the frame is characterized in that it is used for error detection of the entire frame or the payload.

The data length identifier of the frame is characterized in that it indicates a length of the payload area or a length of the entire frame.

These frames are characterized in that the data length identifier indicates the length of the entire frame, and in the case where the length of the entire frame indicated in the data length identifier is smaller than a value obtained by adding sizes of the data length identifier, the flow identifier and the FHEC information area or alternatively by adding sizes of the data length identifier, the flow identifier, the FHEC information area and the error detection area, the data length identifier indicates a management information exchange channel or an information exchange channel controlling a traffic.

Moreover, in this case, the frame is preferably set in a predetermined length.

Furthermore, the frame of the present invention is characterized in that some specified numbers given by the flow identifier indicates a management information exchange channel or an information exchange channel controlling a traffic.

Still further, the frame of the present invention is characterized in that, in the case where a length M of the data length identifier is four-byte length, and a length n of the flow identifier is one-byte length, coding of the FHEC is different from a header error check (hereinafter referred to as "HEC") system for an asynchronous transfer mode (hereinafter referred to as "ATM").

Still further, the frame of the present invention is characterized in that, in the case where an area of the flow identifier or of the data length identifier exceeds a predetermined length, exceeded bytes from predetermined bytes are arranged at the rear of bytes after the FHEC area.

Still further, the frame of the present invention is characterized in that, in the payload thereof, one or more of a layer 3 data frame, or layer 2 data frame or a layer 1 data frame is or are accommodated.

A frame extraction circuit of the present invention in a network, which connects a plurality of different client apparatuses, concentrates client data frames transferred from the client apparatuses to multiplex the same on a same carrier wave, separates the client data multiplexed on the same carrier wave, and transfers the client data frames to client apparatuses opposite to the client apparatuses transmissively, comprises: a phase adjustment buffer for storing a input signal row temporarily in the case where a signal row having the frame of the present invention and an ATM cell multiplexed on a same carrier wave is received;

A flow amount counter for counting the signal row transferred from the phase adjustment buffer to subtract the counted value from a predetermined value; an output encoder for outputting a signal row transferred from the flow amount counter and a classification of the signal row in the case where the output encoder is in an active status; an n-byte storer for storing n bytes in an input signal row; an FHEC decoder for converting M bytes immediately before the n bytes stored in the n-byte storer into a numerical value of the n bytes according to a same coding method as that of FHEC of the frame; a one-byte storer for storing one byte of the input signal row; an HEC decoder for converting four byte immediately before the one byte stored in the one-byte storer according to a same coding method as that of HEC of an ATM; a first comparator for comparing a value of the FHEC decoder and a value of the n-byte storer with each other and for sending FHEC hunting information in the case where the value of the FHEC decoder and the value of the n-byte storer are identical; a second comparator for comparing a value of the FHEC decoder and a value of the one-byte storer with each other, and for sending HEC hunting information in the case where the value of the FHEC decoder and the value of the one-byte storer are identical; a determinator for receiving FHEC hunting information from the first comparator and HEC hunting information from the second comparator to detect that the frame or the ATM cell is received; a frame length storer for reading the frame overhead from the FHEC decoder to compute a frame length, for holding the ATM cell length and a predetermined frame length and for setting a numerical value held in the flow amount counter; and a status management section for sending a frame classification signal to the frame length storer and a numerical value setting instruction signal to the flow amount counter according to control signals from the determinator and the flow amount counter to notify active status or non-active status signals and a signal identifying the frame or the ATM to the output encoder, in which the frame or the ATM is separated from each other.

Moreover, the frame extraction circuit of the present invention is characterized in that the status management section sets the output encoder into an active status together with information of the hunt frame or the ATM cell in the case where receipt of hunting information of the frame or the ATM cell from the determinator upon receiving a control signal indicating that a counter value from the flow amount counter is equal to a threshold value or less occurs a number of times equal to a predetermined one or more, and the status management section sets the output encoder into a non-active status in the case where the status management section does not receive hunting information of the frame or the ATM cell from the determinator when the status management section receives a control signal indicating that a counter value from the flow amount counter is equal to a threshold value or less, and in the case where receipt of hunting information of the frame or the ATM cell from the determinator upon receiving a control signal indicating that a counter value from the flow amount counter is equal to a threshold value or less is not detected a number of times equal to a predetermined one or more.

Furthermore, the extraction circuit of the present invention is characterized in that the status management section notifies a frame classification to the frame length storer upon receiving a control signal indicating that a counter value from the flow amount counter is equal to a threshold value or less, and notifies to the frame length storer a setting instruction to the flow amount counter upon receiving a control signal indicating that a counter value from the flow amount counter is zero.

Still further, the extraction circuit of the present invention is characterized in that, upon receiving a frame classification signal from the status management section, in the case where the frame classification is a frame, the frame length storer extracts an overhead of the frame of the present invention from the FHEC decoder, refers to the data length identifier and the flow identifier, computes from the data length identifier if the frame is not a frame for management and control, and holds a previously set data length if the frame is the frame for management or control, and in the case where the frame classification is an ATM cell, the frame length storer holds a previously set data length, and upon receiving an setting instruction signal from the status management section to the flow amount counter, the frame length storer sets the stored data length into the flow amount counter.

A transmission apparatus of the present invention in a network, which connects a plurality of different client apparatuses, concentrates client data frames transferred from the client apparatuses to multiplex the same on a same carrier wave, separates the client data multiplexed on the same carrier wave, and transfers the client data frames to client apparatuses opposite to the client apparatuses transmissively, comprises: input client data terminators, each being for terminating a client data frame other than an ATM from the client apparatus to detect a client data frame length and an attribute thereof; client data buffers, each being for temporarily storing a client data frames from the input client data terminator; frame overhead generators, each being for reading out data having a designated size from the client data buffers after generating an overhead of the frame of the present invention based on a client data frame length and an attribute which are notified from the input client data terminators; frame generators, each being for constituting the frame by combining the client data frame read out from the client data buffers and data transferred from the frame overhead generators; first input buffers, each being for temporarily storing the frames transferred from the frame generators; an ATM data terminators for terminating ATM cells from ATM client apparatuses; a second input buffers for temporarily storing ATM cells transferred from the ATM data terminators; receivers, each being for terminating a carrier wave having the frame and the ATM cell mixed; frame extractors, each having a frame extraction circuit constitution which separates signal rows from the receiver into the unit of a frame or an ATM cell; third input buffers, each being for temporarily storing the frame or the ATM cell which are transferred from the frame extractor; a scheduler for determining an output port with reference to the flow identifier transferred from each of the first, second and third input buffers and a connection identifier of the ATM cell and reading out the frame and the ATM cell from the input buffers in consideration of a priority and quality thereof; a frame SW for exchanging the frame and the ATM cell which are transferred from the input buffers, the frame SW being controlled by the scheduler; first, second and third output buffers for storing the frame and the ATM cell transferred from the frame SW; frame adaptation sections, each being for accommodating the frames and the ATM cells which are transferred from the first output buffers onto the same carrier wave; transmitters, each being for transferring a signal from the frame adaptation section onto a carrier wave; frame overhead terminators, each being terminating and deleting an overhead of the frame transferred from the second output buffer to form only a payload; output client data terminators, each being for converting payload from the frame overhead terminator to transfer the converted client data frame to an client apparatus; and an output ATM data terminators for transferring ATM cells from the third output buffers to ATM client apparatuses.

Moreover, the transmission apparatus of the present invention further comprises: scramblers, each being for randomizing client data transferred from the client data buffer to transfer the randomized client data to the frame generator; and descramblers, each being for returning a signal row of the client data randomized by the scrambler, the signal row being transferred from the frame overhead terminator, into the original client data to transfer of the returned client data.

Furthermore, the transmission apparatus of the present invention further comprises: error detection redundancy adders, each being for adding a redundancy bit having a fixed length for error detection to an inputted client data frame; and error detectors, each being for detecting an error from data composed of inputted client data frame and a redundancy bit for error detection, and for deleting a redundancy bit for error detection, in which the frame overhead generator counts an amount of redundancy bits as a payload length, and constitutes a data identifier of the frame of the present invention.

Still further, the transmission apparatus of the present invention is characterized in that each of the error detection redundancy adders is arranged between the client data buffer and the frame generator, and each of the error detectors is arranged between the frame overhead terminator and the client data terminator.

Still further, the transmission apparatus of the present invention is characterized in that, upon detecting an error, the error detector revises or discards the client data frame or the entire frame of the present invention.

Still further, the transmission apparatus of the present invention is characterized in that each of the error detection redundancy adders is arranged between the frame generator and the second input buffer, and each of the error detectors is arranged between the second output buffer and the frame overhead.

Still further, the transmission apparatus of the present invention further comprises: client data frame spliters, each being for converting a data length into a numerical value of data lengths equal to a previously designated length or less to notify the converted numerical value to the frame overhead in the case where the data length notified from the client data terminator is longer than the previously designated length; and client data frame constructors, each being for temporarily storing a payload of the frame of the present invention, and for returning the split client data frame into an original client data frame in the case where the client data frame of the payload is split.

Still further, the transmission apparatus of the present invention is characterized in that each of the client data frame spliters is arranged between the client data terminator and the frame overhead generator, and each of the client data frame constructors is arranged immediately before the client data terminator.

Still further the transmission apparatus of the present invention is characterized in that, in the case where there do not exist the frame or the ATM cell which is transferred from the first output buffer, each of the frame adaptation sections constitutes the frame of the present invention setting the payload to zero.

BRIEF DESCRIPTION OF THE DRAWINGS

For a more complete understanding of the present invention and the advantages thereof, reference is now made to the following description taken in conjunction with the accompanying drawings.

FIG. 10 is a view showing the prior art in which the client data frame is converted into the frame relay.

DETAILED DESCRIPTION OF THE PREFERRED EMBODIMENTS

Figure 1:
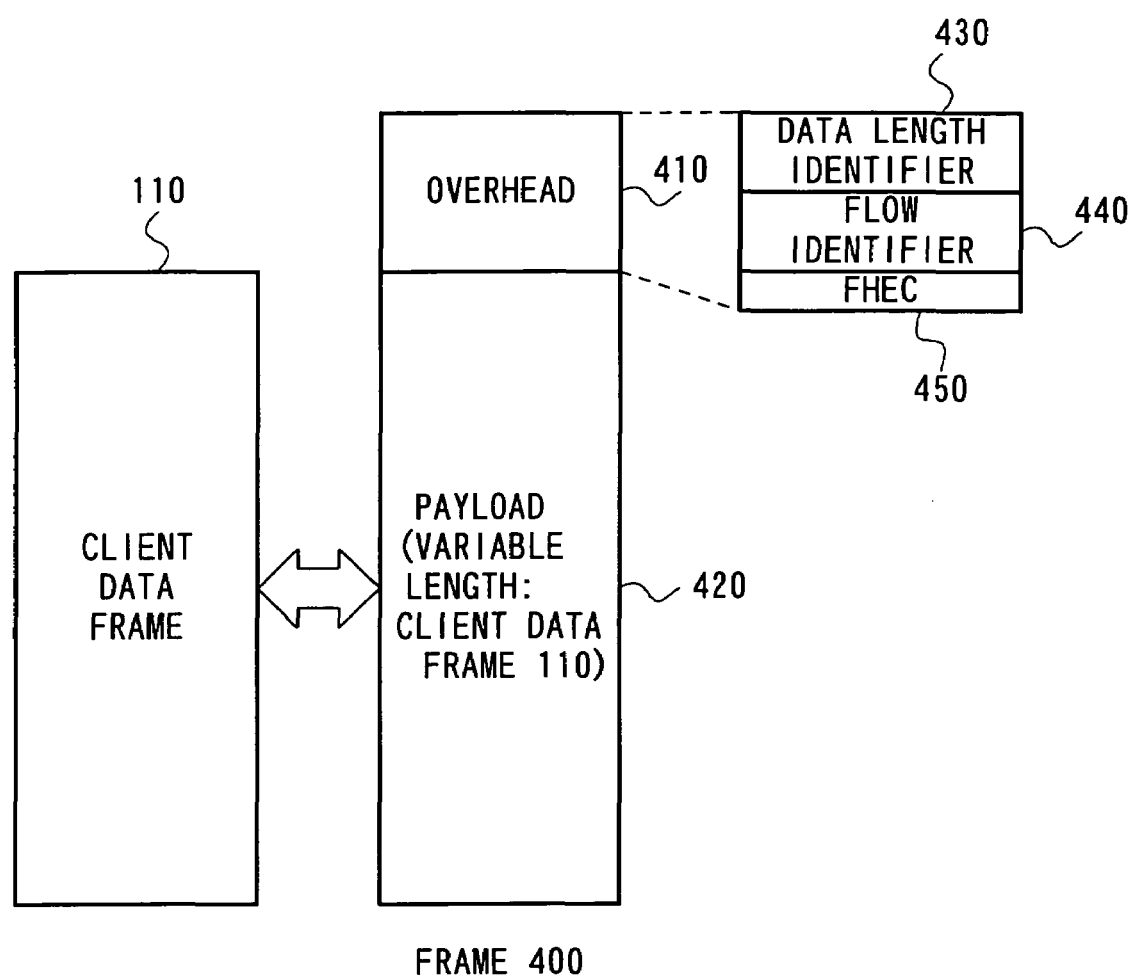
FIG. 1 is a view showing a constitution of a frame according to a first embodiment of the present invention.

FIG. 1 is a view showing the constitution of a frame according to the first embodiment of the present invention. A frame 400 in this embodiment is constituted of an overhead 410 and a payload 420. The overhead 410 is constituted of: a data length identifier 430 indicating a length of the frame or the payload; a flow identifier 440 indicating an attribute of the frame 400; and a frame header overhead error check (FHEC) 450 storing a result obtained by converting bytes from the head of the frame 400 to a specified M-th byte into a numerical value of n bytes according to a certain coding method.

Particularly in the case where M is equal to 4 and n is equal to 1 in the FHEC 450, as a coding method for generating the FHEC 450, a method different from that for header error check (HEC) of the ATM cell is used. Alternatively, a maximum length of the payload 420 is computed from the data length identifier of the overhead 430.

The data traffic frame 110 is mapped into the payload 420. When the client data frame 110 is accommodated, values in response to the size and a predetermined attribute of the client data frame 110 are given to the data length identifier 430 and the flow identifier 440 of the frame 400. Thereafter, similarly to the ATM cell 130 and the frame relay 300, the data length identifier 430 and the flow identifier 440 of the frame 400 are mapped into the payload on the carrier wave.

The node having received the frame 400 refers to the flow identifier 440 after extracting the frame 400. As a result, if the frame 400 is the one to be terminated, the overhead 410 is deleted and the rest thereof is converted into the client data frame 110. The flow identifier 440 does not only function as a multiplex identifier of the client data frame 110 but also can be used as an identifier for constructing a closed network such as a Quality of Service (QoS) and a Virtual Private Network (VPN).

The extraction of the frame 400 can be realized when certain M bytes having a numerical value composed of n bytes given by the same coding as in the case where the FHEC 450 is formed and a numerical value of n bytes following the M byte are identical. As for Operation and Maintenance & Performance (OAM&P) of the frame 400, a specified number of the flow identifier 440 can be allocated to identify the frame 400 as an OAM&P traffic.

Moreover, in the case where the data length identifier 430 is defined to show not the length of the payload 420 but the length of the entire frame 400, since the frame 400 having a length less than that of the M plus n bytes does not exist, if the payload identifier indicates a numerical value equal to that of the M plus n or lower, the frame 400 can be regarded as the OAM&P traffic. At this time, the length of the frame 400 is required to be constant.

Figure 2:
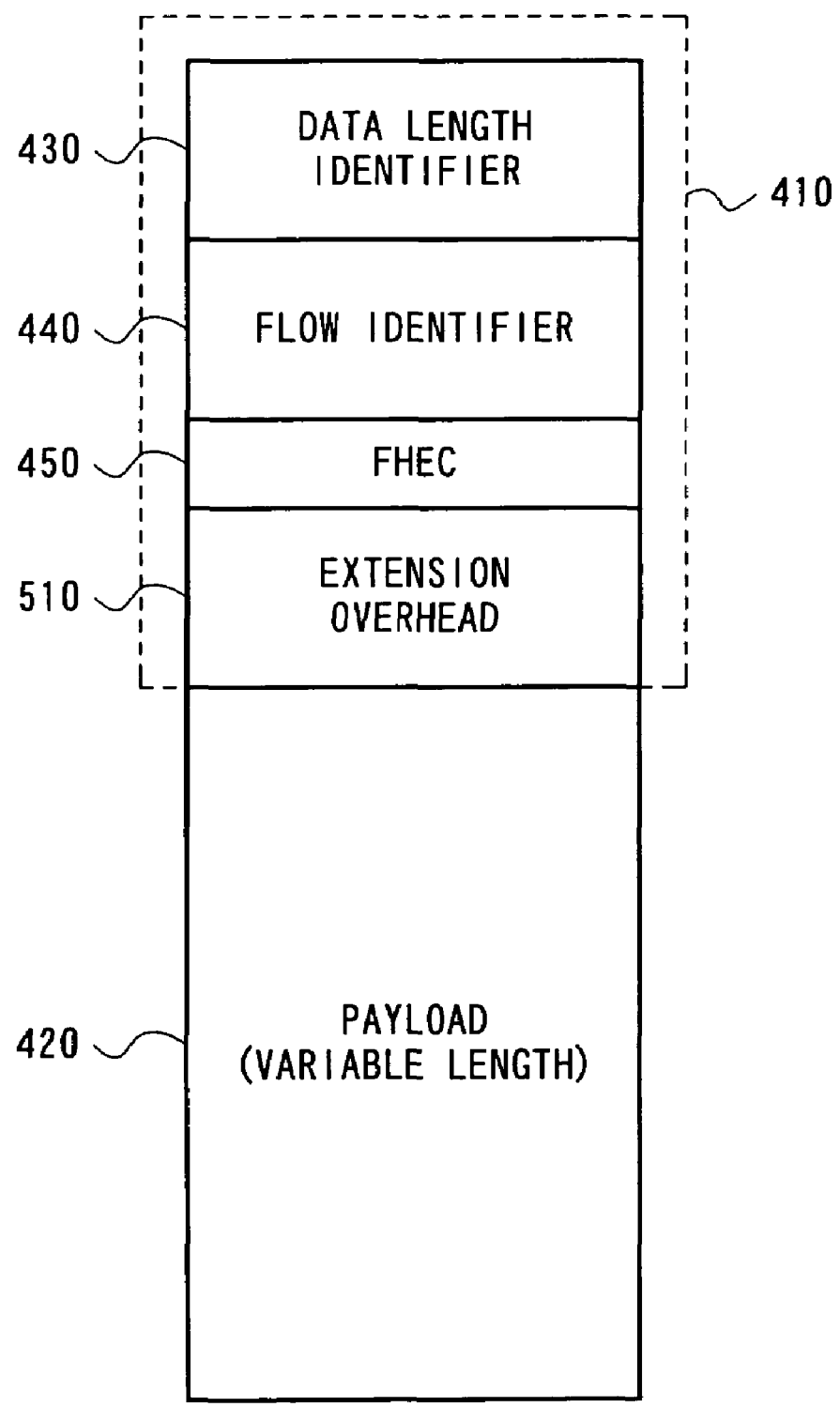
FIG. 2 is a view showing a constitution of a frame, which is obtained by extending the first frame, according to a second embodiment of the present invention.

Moreover, in the case where there is a fear that the flow identifier 440 may be exhausted or other overheads are required, the frame 400 can be 8 constituted in which an extension overhead 510 is added thereto as shown in FIG. 2 (constitution of the second frame) Also in this case, the position of the FHEC 450 is defined to exist from M plus 1-th byte through n-th byte, and the extension overhead 510 is arranged at a position from M plus n plus 1-th byte. The extension overhead 510 may be previously arranged, or may be distinguished from the frame 400 by adding the same to a specified flow identifier 440.

Figure 3:
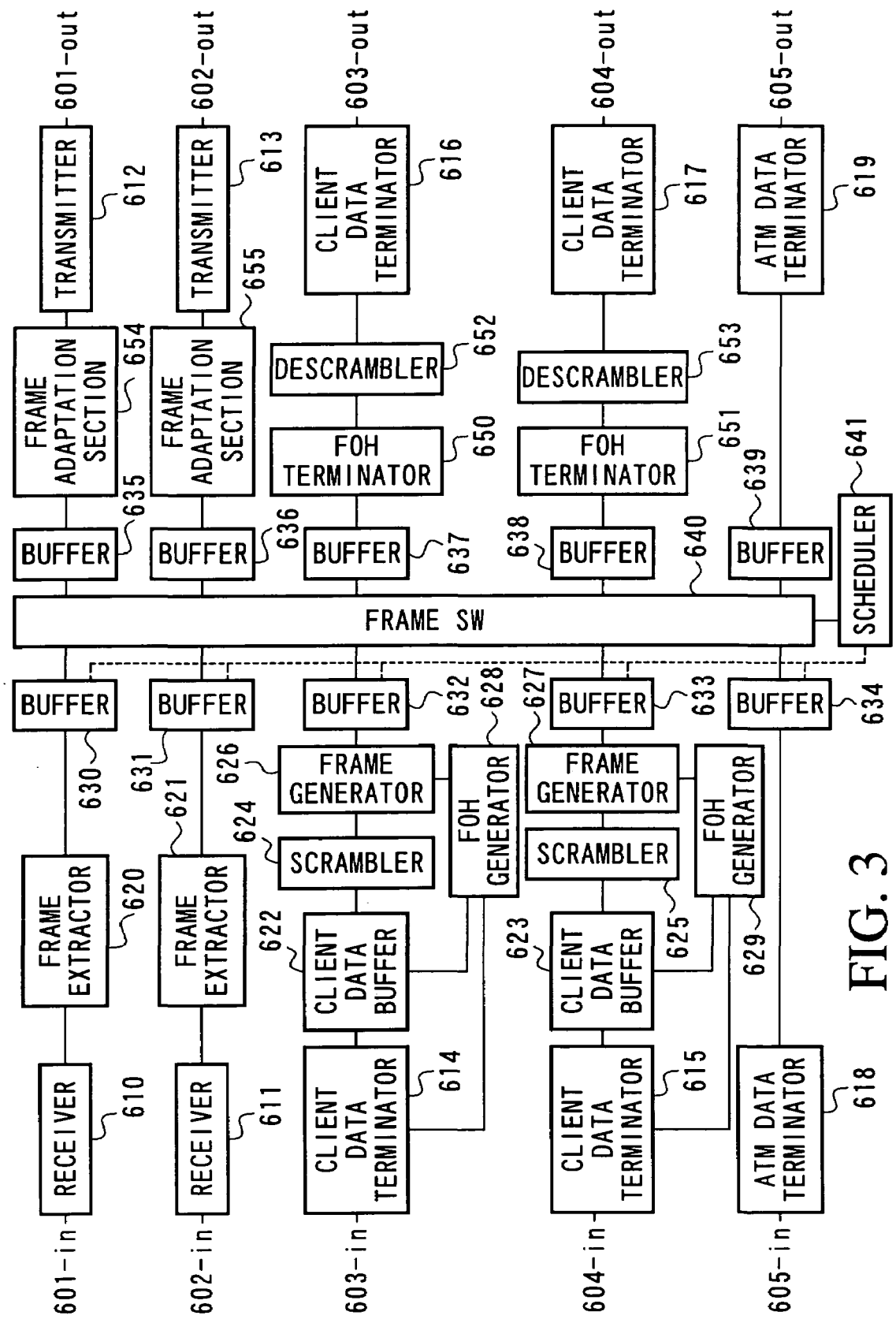
FIG. 3 is a block diagram showing a transmission apparatus according to the first embodiment of the present invention.

FIG. 3 is a block diagram showing a transmission apparatus according to the first embodiment of the present invention. The transmission apparatus of the present invention has functions of: converting the client data frame 110 other than the ATM into the frame 400 of the present invention; sending out the frame 400 on the same carrier wave as the ATM cell 130; separating the frame 400 and the ATM cell 130 that have been transferred on the same carrier wave; defining the frame 400 and the ATM cell 130 as the client data frame 110 and the ATM cell 130 respectively; and outputting the same from a desired output port.

In FIG. 3, a transmission apparatus 600 is constituted of: receivers 610 and 611; transmitters 612 and 613; client data terminators 614 to 617; ATM cell terminators 618 and 619;

frame extractors 620 and 621; client data buffers 622 and 623; scramblers 624 and 625; frame generators 626 and 627; frame overhead (FOH) generators 628 and 629; buffers 630 to 639; a scheduler 641; frame SW 640; frame overhead (FOH) terminators 650 and 651; descramblers 652 and 653; and frame adaptation section 654 and 655.

Herein, reference numerals 601 and 602 denote input/output lines for the frames 400 and the ATM cells 130 that are transferred on the same carrier wave, and numerals 603 to 605 denote input/output lines for single client data frames, respectively. Among them, the numerals 603 and 604 denote input/output lines for the client data frames of other than the ATM, and the numeral 605 denotes an input/output line for the ATM cells 130. Moreover, it is assumed that the client data frame 110 from the input lines 603-in to 605-in is sent out to any one of the output lines 601-out to 602-out, multiple signals of the frames 400 and the ATM cells 130 from the input lines 601-in and 602-in are sent out to any one of the output lines 603-out to 605-out.

The receivers 610 and 611 establish byte synchronization of signal rows of carrier waves from the input lines 601-in and 602-in, and only transfer the signal rows having the frames 400 and the ATM cells 130 multiplexed to the frame extractors 620 an 621. The frame extractors 620 and 621 digitize the inputted M bytes, converts the M bytes into a numerical value of n bytes based on the coding system used when the FHEC 450 is constituted, and compares the converted numerical value of n bytes with a numerical value of n bytes inputted following the M bytes.

Moreover, a result obtained by adding modulo values for the ATM to a result obtained by computing four bytes of the inputted CRC 8 is compared with a value of the next one byte. This comparison is performed in parallel, thus the ATM cell 130 and the frame 400 are extracted (More details will be described later.) The extracted frame 400 and the ATM cell 130 are transferred to the buffers 630 and 631.

The client data terminators 614 and 615 identify attributes of the inputted client data frames, measure data length thereof, then transfer the client data frames to the client data buffers 622 and 623. Moreover, the client data terminators 614 and 615 transfer attribute information and data length information to the FOH generators 628 and 629. The FOH generators 628 and 629 constitute the data length identifiers 430 and the flow identifiers 440 by use of the attribute information and the data length information, and write in a value obtained by converting the numerical value from the head to the M-th byte into the numerical value of n bytes according to a predetermined coding method to the FHEC 450.

Thereafter, the FOH generators 628 and 629 transfer the obtained overheads to the frame generators 626 and 627, then transmits control signals to the client data buffers 622 and 623 to read out data having a designated length. The read-out client data traffics are encoded by the scramblers 624 and 625, then synthesized with the overheads 410 from the FOH generators 628 and 629 by the frame generators 626 and 627, form the frames 400, and transfer the frames 400 to the buffers 632 and 633. On the other hand, the ATM cells 130 from the input line 605-in is inputted from the ATM cell terminator 618 to the buffer 634.

When the frames 400 are inputted, the buffers 630 to 634 notify the data length and the output port from the data length identifier 430, the flow identifier 440 or the extension overhead 510 to the scheduler 641. When the ATM cells 130 are inputted, the buffers 630 to 634 refer to the overheads 132 thereof, and notify the cell length and a desired output port to the scheduler 641.

The scheduler 641 controls the buffers 630 to 634 and the frame SW 640, determines an order of frame multiplexing in consideration with quality, priority control or a band and the like, reads out the frames 400 and the ATM cells 130 from the buffers 630 to 634. The read-out frames 400 and the ATM cells 130 are sent out through the frame SW 640 to the buffers 635 to 639 which are desired ports, respectively.

The frames 400 and the ATM cells 130 that have been transferred to the buffers 635 and 636 are transferred to the frame adaptation sections 654 and 655 in a frame/cell unit. The frame adaptation units 654 and 655 map the frames 400 or the ATM cells 130 into the payload of the carrier wave. Thereafter, these signal rows are transferred from the transmitters 612 and 613 by use of a single carrier wave.

The frames 400 that have been transferred to the buffers 637 and 638 are transferred to the FOH terminators 650 and 651. In the FOH terminators 650 and 651, the overheads 410 are deleted from the frames 400, then the frames 400 are transferred to the descramblers 652 and 653. The descramblers 652 and 653 release scrambles of the frames 400, and return the frame 400 to the client data 110. Thereafter, the client data 110 are sent out from the client data terminators 616 and 617 to the output lines 603-out and 604-out.

The ATM cell 130 that has been transferred to the buffer 639 is transferred to the ATM cell terminator 619, and sent out from the output line 605-out.

In FIG. 3, the client data buffers 622 and 623 are arranged immediately after the client data terminators 614 and 615. However, it is satisfactory that since the client data buffers 622 and 623 are arranged between the client data terminators 614 and 615 and the frame generators 626 and 627, the positional relation between the client data buffers 622 and 623 and the scramblers 624 and 625 may be inversed. Furthermore, in this embodiment, the byte synchronization during the frame extraction has been described as a function of the receivers 610 and 611, however the function thereof may be held by the frame extractors 620 and 621.

The scramblers 624 and 625 and the descramblers 652 and 653 of FIG. 3 are used in order that the frame extraction pattern cannot come out on the client data. However, without using them, the transmission apparatus can be operated. In the case where there does not exist the client data frames 110 or the ATM cells 130, which are to be uploaded on the payload 420, the frame adaptation sections 654 and 655 map the frames 400 composed only of the overheads 410. At this time, as for the size of the data length identifiers 430, zero or the size of the overheads may be satisfactory.

Figure 4:
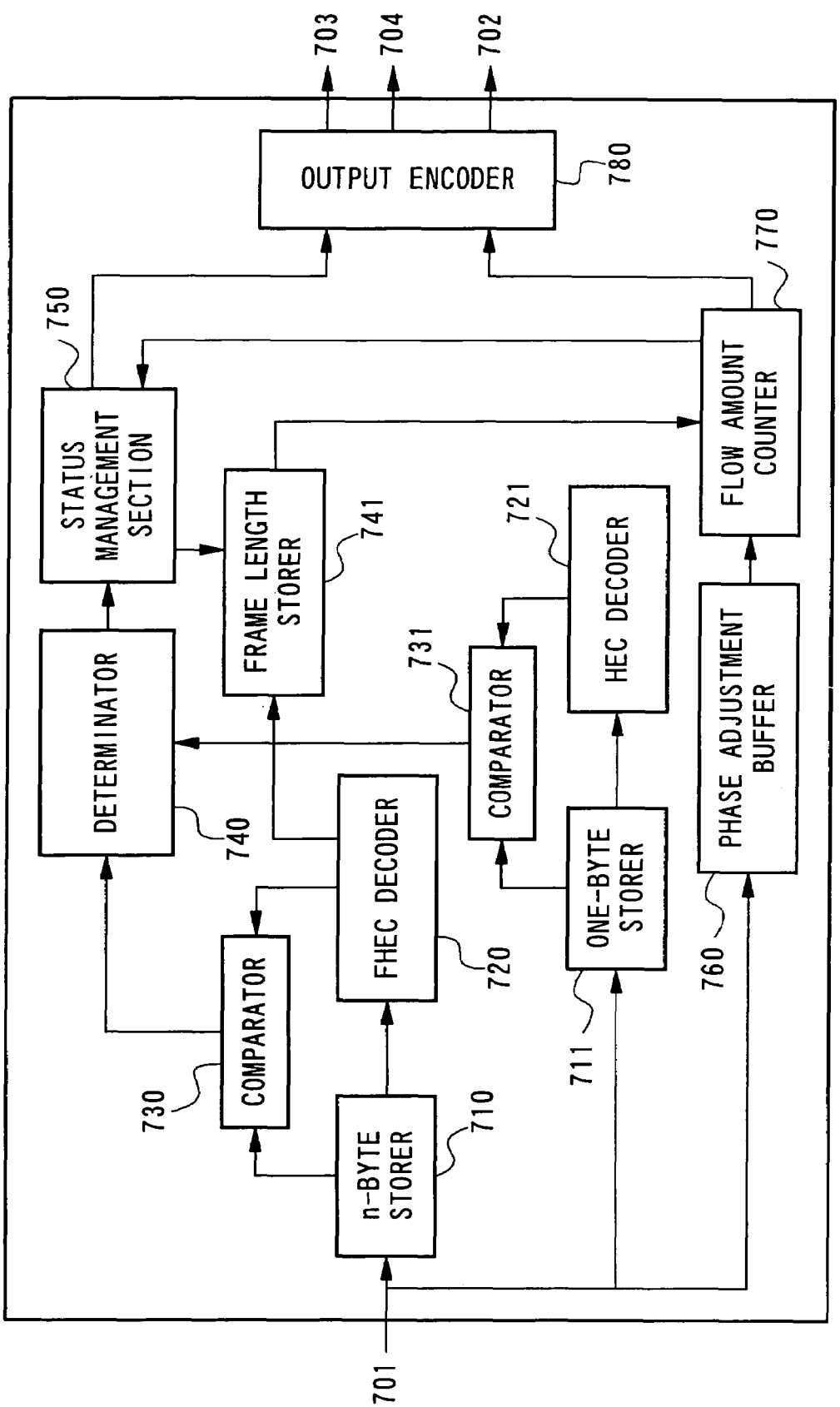
FIG. 4 is a block diagram showing a constitution example of the frame extractor used in the transmission apparatus of the present invention.
Figure 5:
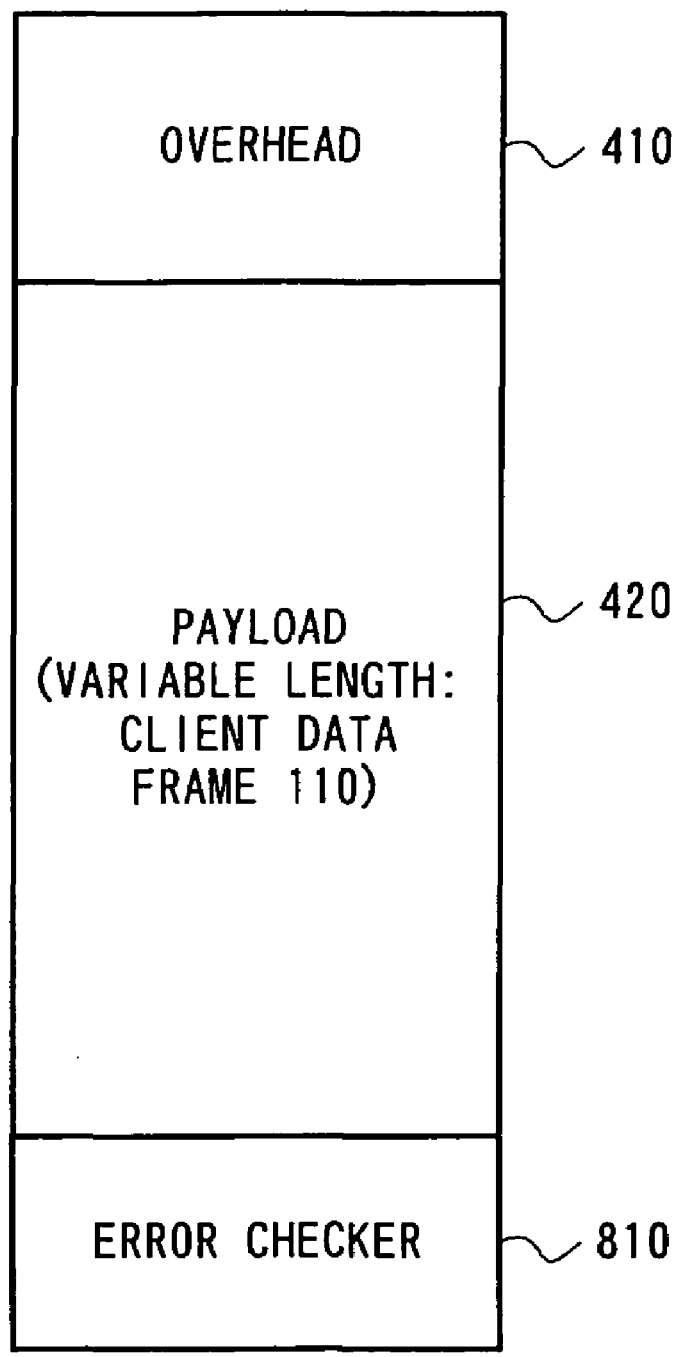
FIG. 5 is view showing a constitution of a frame according to a third embodiment of the present invention.

FIG. 4 shows a constitution example of the frame extractors 620 and 621. Each of the frame extractors 620 and 621 is constituted of: an n byte Fr storer 710; a one byte storer 711; an FHEC decoder 720; an HEC decoder 721; comparators 730 and 731; a determinator 740, a frame length storer 741; a status management section 750; a phase adjustment buffer 760; a flow amount counter 770; and an output encoder 780. Signal rows from an input port 701 are branched to be inputted to the phase adjustment buffer 760, the n byte storer 710 and the one byte storer 711.

Signal rows inputted to the phase adjustment buffer 760 are held for a certain period of time, then transferred to the flow amount counter 770. The flow amount counter 770 counts the signal rows, and subtracts an amount equivalent to signal rows having passed therethrough from a size notified from the frame length storer 741. In the case where the counter value is lowered than a set value and becomes zero, the flow amount counter 770 sends a control signal to the status management section 750. The signal rows having passed through the flow amount counter 770 are transferred to the output encoder 780, and outputted from an output port 702.

The n byte storer 710 stores n bytes, and notifies a numerical value thereof to the comparator 730, then performs a byte shift to transfer the signal rows to the FHEC decoder 720. The FHEC decoder 720 converts the M bytes immediately before the n bytes stored in the n byte storer 710 into a numerical value of the n bytes by means of the coding for the FHEC, and transfers an obtained result to the comparator 730.

Similarly to the above, the one byte storer 711 having signal rows inputted converts the stored one byte into a numerical value, and notifies an obtained result to the comparator 731. Thereafter, the concerned byte is transferred to the HEC decoder 721. The HEC decoder 721 converts four bytes immediately before the one byte stored in the one byte storer 711 into a numerical value of the one byte by means of the coding for the HEC, and transfers a result thereof to the comparator 731.

Each of the comparators 730 and 731 compares the inputted numerical values with each other, and notifies a result thereof to the determinator 740. If it is determined from the result that the bytes (or a group of the bytes) stored in the n byte storer 710 or the one byte storer 711 are the FHEC 450 or the HEC, the determinator 740 notifies an FHEC/HEC hunting signal to the status management section 750.

The status management section 750 monitors a frame synchronization status based on the FHEC/HEC hunting signal from the determinator 740 and the control signal from the flow amount counter 770. The status management section 750 transfers next frame information to the frame length storer 741 upon receiving the HEC/FHEC hunting signal from the determinator 740 at the same time when a control signal indicating that the counter value is equal to a threshold value or less is inputted from the flow amount counter 770 (frame hunt status).

If the next frame is the frame 400, the frame length storer 741 reads out the data length identifier 430 and the flow identifier 440 that are stored in the FHEC decoder 720. And, if the frame 400 is not a special frame, the frame length storer 741 computes a frame length thereof from the data length identifier 430. If the frame 400 is a special frame, the frame length storer 741 holds the frame length thereof as a predetermined frame length. On the other hand, if the next frame is the ATM cell 130, the frame length storer 741 holds fixed fifty three bytes. Thereafter, upon receiving a control signal having a counter value of zero from the flow amount counter 770, the status management section 750 notifies that to the frame length storer 741. The frame length storer 741 stores the size of the next frame 400 or the next ATM cell 130, which has been held, in the flow amount counter 770.

The status management section 750 sets a frame synchronization status when the frame hunt status continues a predetermined number of times or more. In the case of this status, upon receiving the information telling that the counter value is zero from the flow amount counter 770, the status management section 750 sets the output encoder 780 into an active status, and notifies classification of the next transfer frame thereto.

When the output encoder 780 is in an active status, if the transferred signal row is the frame 400, the output encoder 780 sends out an active pulse to the frame signal line 703. If the transferred signal row is the ATM 130, the output encoder 780 sends out an active pulse to the ATM signal line 704. Moreover, sending out of the signal row of the next frame together with the pulse is started from the output port 702.

Figure 8:
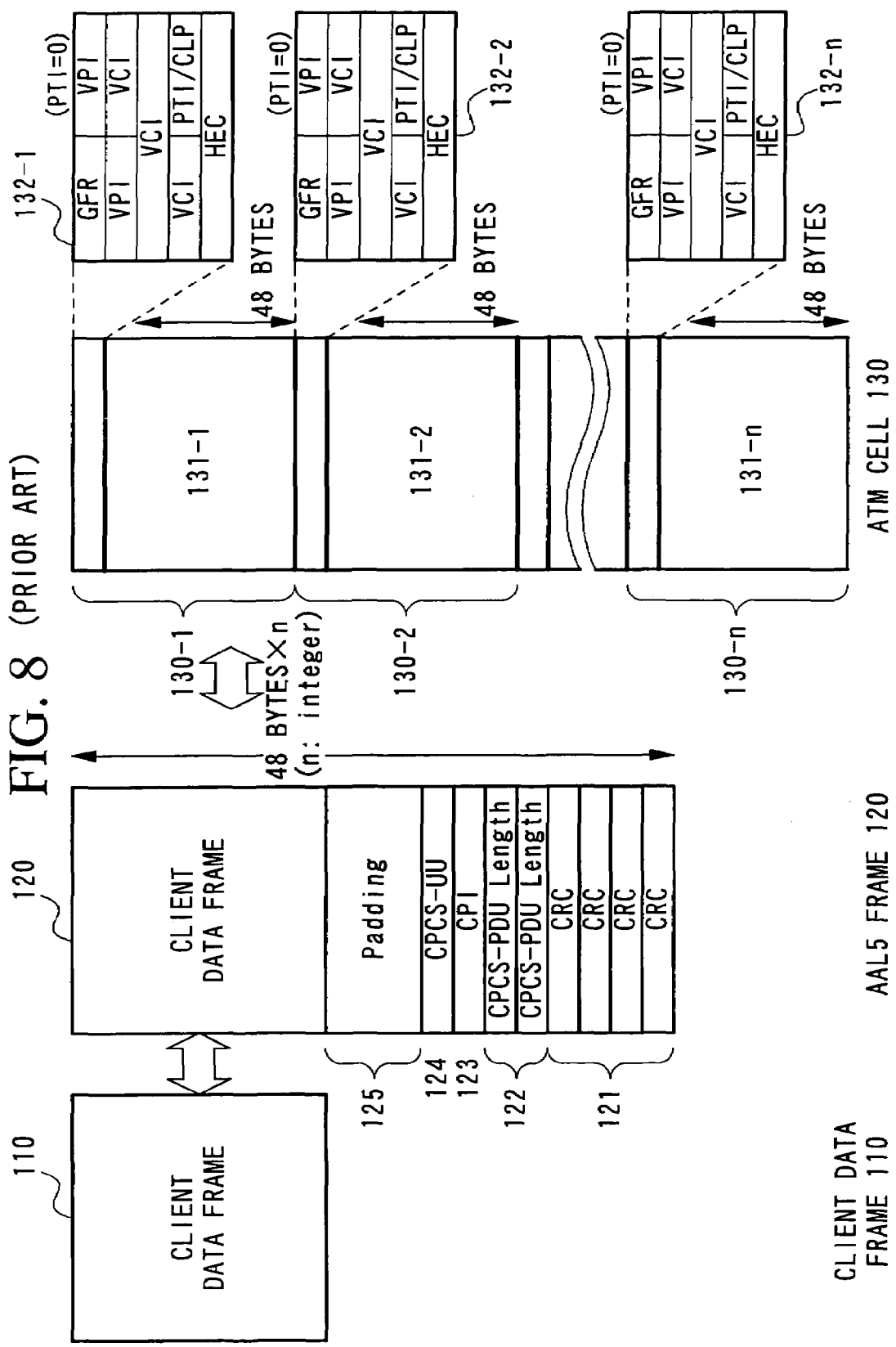
FIG. 8 is a view showing the prior art in which the client data frame is converted into the ATM cells through the AAL5 frame.
Figure 9:
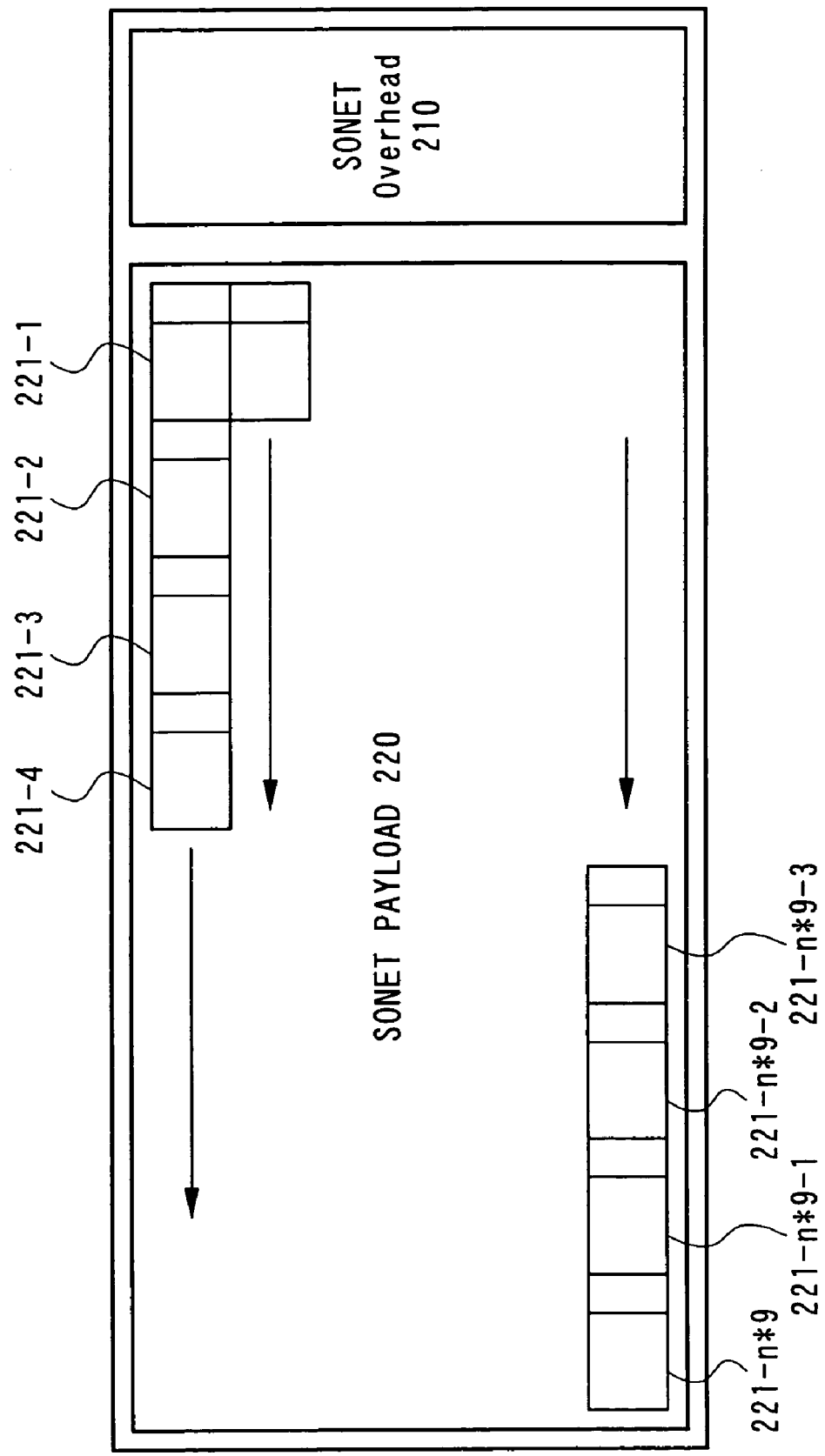
FIG. 9 is a view showing the prior art in which the ATM or the frame relay or the frame is mapped into the SONET.

With reference to FIGS. 8 and 9, the constitution of the third frame and the second transmission apparatus will be described. A frame 800 of the present invention has a constitution in which an error checker 810 is added at the rear of the payload 420 of the first frame 400 of the present invention. The error checker 810 detects an error of the entire frame 800 or the payload 420.

Figure 6:
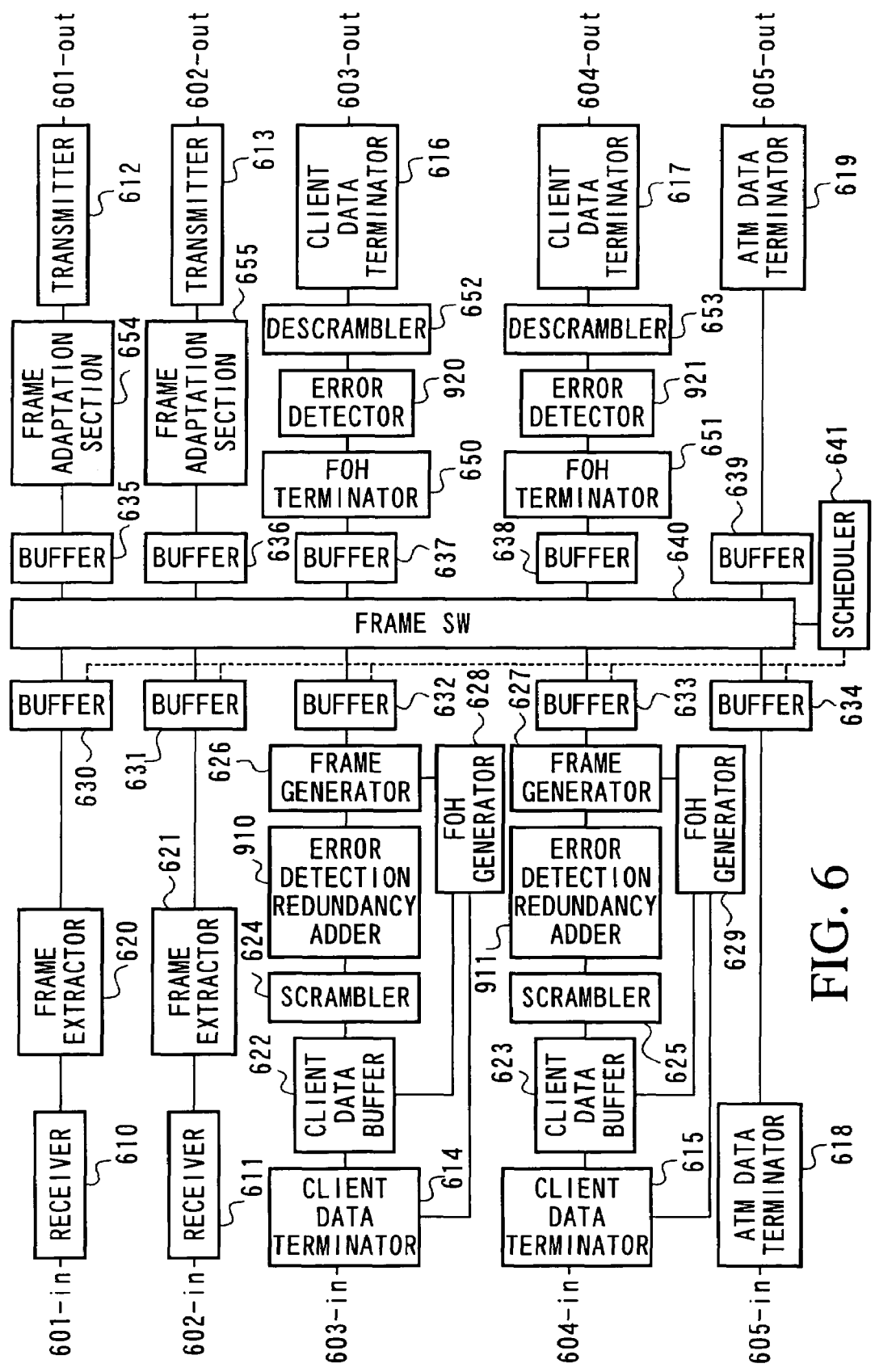
FIG. 6 is a block diagram showing a transmission apparatus according to the second embodiment of the present invention.

FIG. 6 shows a transmission apparatus for converting the client data frame other than the ATM cell into the third frame of the present invention and for multiplexing the third frame on the same carrier wave as that of the ATM cell. A transmission apparatus 900 has a constitution in which error detection redundancy adders 910 and 911 and error detectors 920 and 921 are added to the first transmission apparatus 600 of the present invention. Hereinbelow, only differences from FIG. 3 will be described.

The error detection redundancy adders 910 and 911 add redundancy bits having a fixed length for detecting an error to each of the client data frames sent out from the scramblers 624 and 625. Since the client data length is changed by adding the redundancy bits, each of the FOH generators 628 and 629 determines a value of the data length identifier 430 in consideration of an amount obtained by adding the redundancy bits having a fixed length to the client data length. Moreover, each of the error detectors 920 and 921 performs an error check for the frame 800 transferred from each of the FOH terminators 650 and 651. And if an error is detected, the error detectors 920 and 921 revise or discard the concerned frame 800.

In FIG. 6, only the client data frame, that is, only the payload 420 is set to be an object of the error check. In the case where the error check is performed not only on the payload 420 but also on the overhead 410 of the frame 800, the error detection redundancy adders 910 and 911 are arranged between the frame generators 626 and 627 and the buffers 632 and 633, and the error detectors 920 and 921 are arranged between the buffers 637 and 638 and the FOH terminators 650 and 651.

In the case where the error detection is performed only on the payload 420, the error detection redundancy adders 910 and 911 may be arranged anywhere between the client data terminators 614 and 615 and the frame SW 640. In the case where the error detection redundancy adders 910 and 911 are arranged between the scramblers 624 and 625 and the client data terminators 614 and 615, the error detectors 920 and 921 must be arranged between the descramblers 652 and 653 and the client data terminators 616 and 617. In the case where the error detection redundancy adders 910 and 911 are arranged between the scramblers 624 and 625 and the frame SW 640, the error detectors 920 and 921 must be arranged between the SW 640 and the descramblers 652 and 653.

Figure 7:
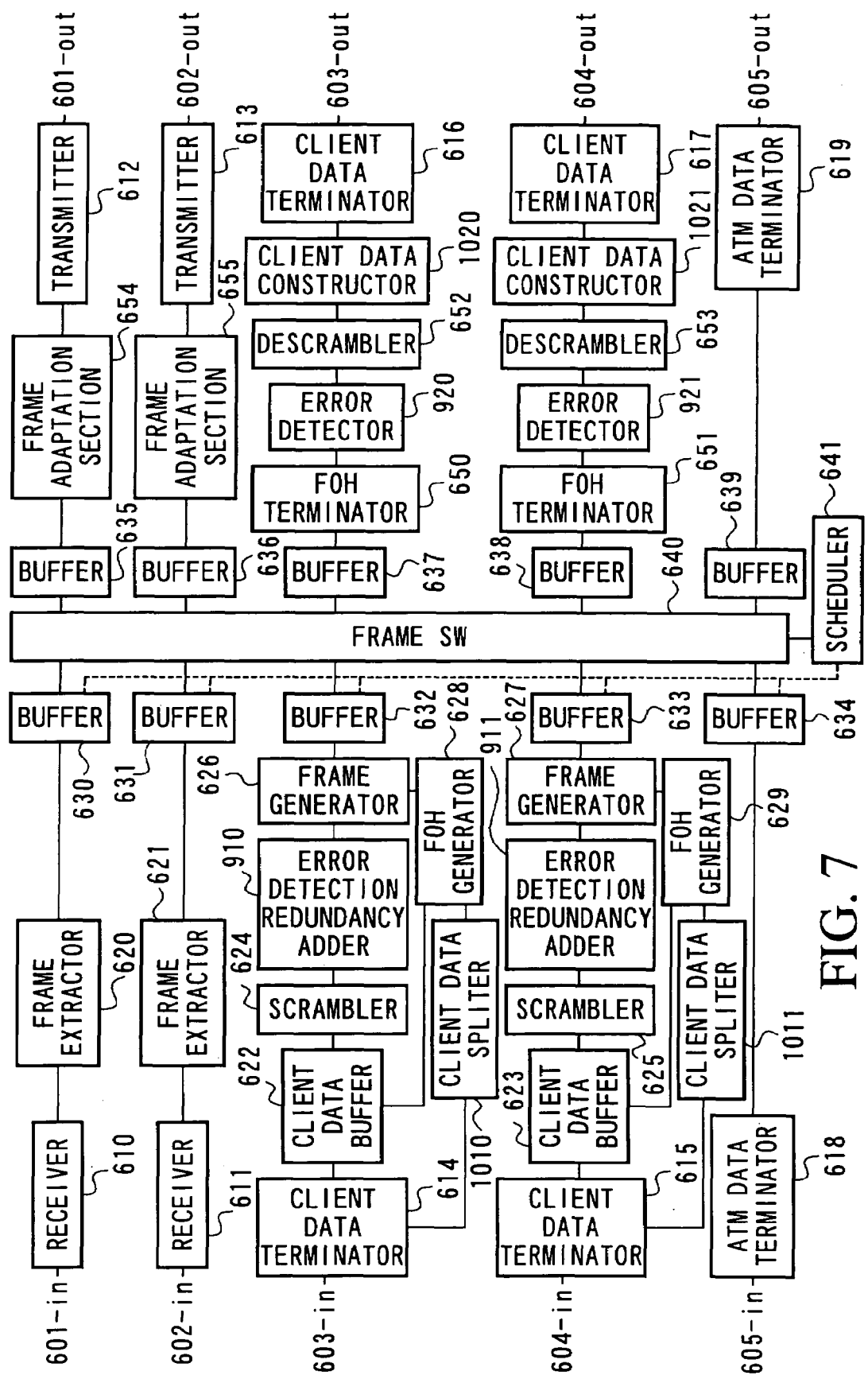
FIG. 7 is a block diagram showing a transmission apparatus according to the third embodiment of the present invention.

With reference to FIG. 7, the third transmission apparatus of the present invention will be described. The transmission apparatus of FIG. 7 has a constitution in which client data spliters 1010 and 1011 and client data constructors 1020 and 1021 are added to the transmission apparatus 600 of FIG. 3 or the transmission apparatus 900 of FIG. 6. Hereinbelow, only differences from FIG. 6 will be described.

In the case where the length of the client data notified from each of the client data terminators 614 and 615 exceeds a predetermined maximum length, each of the client data spliters 1010 and 1011 adjusts the traffic data length so that the frame length can be equal to the maximum length or less, then notifies the frame length and the attribute of the client traffic to each of the FOH generators 628 and 629. The FOH generators 628 and 629 constitute the overhead 410 and transfer the same to the frame generators 626 and 627, and pick out the data having a designated length from the client data buffers 622 and 623 to constitute the frame 800 in the frame generators 626 and 627. Thereafter, the frame 800 is transferred to the buffers 632 and 633.

Since the client data transferred from the descramblers 652 and 653 may be split in some cases, the client data constructors 1020 and 1021 temporarily store the client data, reconstruct the client data by use of the client data extraction system defined in each client and transfer the reconstructed client data to the client data terminators 616 and 617.

In the case where the first frame 400 of the present invention is an object for the above-described processing, the error detection redundancy adders 910 and 911 and the error detectors 920 and 921 may be deleted.

In the frame of the present invention, since the FHEC different from the HEC of the ATM cell in coding is arranged, discrimination between the ATM and the frame can be easily realized, and even if the ATM and the frame are mixed, separation thereof can be performed. Moreover, by referring to the flow identifier of the frame, discrimination from still another client data traffic can be performed. Accordingly, even in the case where a plurality of client data exist, these client data can be multiplexed on the same carrier wave.

In this case, since no overhead is required to be added to the ATM cell, multiplexing can be performed efficiently. On the other hand, with regard to the other client data traffic, the overhead of the M plus n bytes or the M plus n plus extending overhead is added. However, since the client data traffic is originally a variable length traffic having several kilobytes at maximum, the overhead addition is small enough to be ignored.

Moreover, since the frame of the present invention is set to be a variable length frame, padding is not required. Accordingly, an efficient frame can be constituted.

Furthermore, in the frame of the present invention, the frame extraction is realized by coding the overhead information, and once the frame extraction is enabled, a frame interval can be grasped. Therefore, the FHEC/HEC can be ignored even if they are detected in the payload. Accordingly, insertion/deletion of the bits and the bytes for avoiding the overhead pattern are not necessary.

Still further, in the frame of the present invention, in the case of performing the frame synchronization, the frame synchronization state is recognized only in the case where the frame extraction is continuously enabled a predetermined number of times or more, and the frame extraction is performed. Moreover, once the frame synchronization state comes off, it is defined as the frame synchronization coming off state, and in the state, the frame synchronization is set not to be resumed until the frame extraction is continuously enabled a given number of times or more again. Accordingly, the probability of the miss-extraction of the frame can be made extremely small.

Still further, in the frame of the present invention, a closed network can be constructed by use of the flow identifier. Accordingly, the frame of the present invention is excellent in conversational confidentiality, and can be applied to a VPN.

Still further, in the frame of the present invention, the flow identifier can be used as an identifier for controlling the QoS. Accordingly, the frame of the present invention can be used as traffic engineering.

Still further, the frame of the present invention can perform the OAM&P information transfer by allocating the flow identifier or the data length identifier to the OAM&P traffic. Accordingly, a network management information network can be easily constituted.

Still further, the frame of the present invention can define an overhead having bytes exceeding the M bytes in the case where the data length identifier or the flow identifier is short. Thus, the frame of the present invention is high in scalability.

Still further, in the frame of the present invention, by adding the error check of the payload or the entire frame, the transfer of the client data with high accuracy can be realized.

Still further, the transmission apparatus of the present invention can convert the client data traffic other than the ATM into the frame of the present invention, can freely multiplex or separate the ATM cell and the frame, and can transfer each client data frame or each ATM cell to a desired output port.

Still further, the transmission apparatus of the present invention can convert the client data frame other than the ATM into the frame of the present invention, can freely multiplex or separate the ATM cell and the frame, and can transfer each client traffic data to a desired output port.

Still further, the transmission apparatus of the present invention splits a long client data frame into data frames having permissive data lengths by use of the frame of the present invention in the case where the long client data frame is inputted, transfers the split data frames onto the carrier wave, and returns the split data frames into the original client data frame at the receiver. Thus, the assurance of the QoS can be accurately performed.

Although the preferred embodiments of the present invention have been described in detail, it should be understood that various changes, substitutions and alternations can be made therein without departing from spirit and scope of the inventions as defined by the appended claims.

What is claimed is:

1. A frame extraction circuit in a network, which connects a plurality of different client apparatuses, concentrates client data frames transferred from the client apparatuses to multiplex the same on a same carrier wave, separates the client data frames multiplexed on the same carrier wave, and transfers the client data frames to other client apparatuses, the frame extraction circuit comprising:

a phase adjustment buffer for storing an input signal row temporarily in a case where a signal row having a frame and an ATM cell multiplexed on the same carrier wave is received;

a flow amount counter for counting a value of the signal row transferred from the phase adjustment buffer to subtract the counted value from a predetermined value;

an output encoder for outputting another signal row transferred from the flow amount counter and a classification of the signal row in the case where the output encoder is in an active status;

an n-byte storer for storing n bytes in the input signal row;

an FHEC decoder for converting M bytes immediately before the n bytes stored in the n-byte storer into a numerical value of the n bytes according to a same coding method as that of FHEC of the frame;

a one byte storer for storing one byte in the input signal row;

an HEC decoder for converting four bytes immediately before the one byte stored in the one byte storer into a numerical value of the 1 byte according to a same coding method as that of HEC of an ATM;

a first comparator for comparing a value of the FHEC decoder and a value of the n-byte storer with each other and for sending FHEC hunting information in the case where the value of the FHEC decoder and the value of the n-byte storer are identical;

a second comparator for comparing a value of the FHEC decoder and a value of the one byte storer with each other, and for sending HEC hunting information in the case where the value of the FHEC decoder and the value of the one byte storer are identical;

a determinator for receiving one of FHEC hunting information from the first comparator and HEC hunting information from the second comparator to detect that one of the frame and the ATM cell is received;

a frame length storer for reading frame overhead from the FHEC decoder to compute a frame length, for holding the ATM cell length and a predetermined frame length and for setting a numerical value held in the flow amount counter; and a status management section for sending a frame classification signal to the frame length storer and a numerical value setting instruction signal to the flow amount counter according to control signals from the determinator and the flow amount counter to notify one of active status and non-active status signals and a signal identifying one of the frame and the ATM to the output encoder, wherein the frame and the ATM are separated from each other; and wherein the frame comprises:

a data length identifier indicating a data length;

a flow identifier indicating one of classification, quality and a channel of a client data traffic;

a frame header error check (FHEC) area for an area of n bytes from M plus 1-th byte, which stores a result Y having n bytes or less, the result Y being obtained by computing a numerical value X having the predetermined M bytes from a header by a predetermined coding method; and a payload area having a variable length, which stores client data frames.

2. The frame extraction circuit as recited in claim 1 wherein said frame further comprises an error detection area performing an error check.

3. The frame extraction circuit as recited in claim 2, wherein the error detection area is used for error detection of one of the entire frame and the payload area.

4. The frame extraction circuit as recited in claim 1, wherein the data length identifier indicates a length of one of the payload area and the frame.

5. The frame extraction circuit as recited in claim 1, wherein the data length identifier indicates the length of the frame, and in a case where a value of the data length identifier is smaller than a value obtained by adding sizes of the data length identifier, the flow identifier and the FHEC information area or alternatively a value obtained by adding sizes of the data length identifier, the flow identifier, the FHEC information area and the error detection area, the data length identifier indicates one of a management information exchange channel and an information exchange channel controlling a traffic.

6. The frame extraction circuit as recited in claim 5, wherein the frame has a predetermined length.

7. The frame extraction circuit as recited in claim 1, wherein a specified number given by the flow identifier indicates one of a management information exchange channel and an information exchange channel controlling a traffic.

8. The frame extraction circuit as recited in claim 1, wherein, in a case where a length M obtained by adding the data length identifier and the flow identifier is four-byte length, and a length n of coding of the FHEC is one-byte length, a system different from a header error check (HEC) system for an asynchronous transfer mode (ATM) is employed for coding the FHEC.

9. The frame extraction circuit as recited in claim 1, wherein in a case where areas of one of the flow identifier and the data length identifier exceed a predetermined length, exceeded bytes from predetermined bytes are arranged at the rear of bytes after the FHEC area.

10. The frame extraction circuit as recited in claim 1, wherein in the payload, one or more of a layer 3 data frame, a layer 2 data frame and a layer 1 data frame are accommodated.

11. A frame extraction circuit according to claim 1, wherein the status management section sets the output encoder into an active status together with information of one of the hunt frame and the hunt ATM cell in the case where receipt of hunting information of one of the frame and the ATM cell from the determinator upon receiving a control signal indicating that a counter value from the flow amount counter is equal to a threshold value or less occurs a predetermined number of times or more, and the status management section sets the output encoder into a non-active status in the case where the status management section does not receive hunting information of the frame and the ATM cell from the determinator when the status management section receives a control signal indicating that a counter value from the flow amount counter is equal to a threshold value or less, or in the case where receipt of hunting information of one of the frame and the ATM cell from the determinator upon receiving a control signal indicating that a counter value from the flow amount counter is equal to a threshold value or less is not detected a predetermined number of times or more.

12. A frame extraction circuit according to claim 1, wherein the status management section notifies a frame classification to the frame length storer upon receiving a control signal indicating that a counter value from the flow amount counter is equal to a threshold value or less, and notifies to the frame length storer a setting instruction to the flow amount counter upon receiving a control signal indicating that a counter value from the flow amount counter is zero.

13. A frame extraction circuit according to claim 1, wherein upon receiving a frame classification signal from the status management section, in the case where the frame classification is a frame, the frame length storer extracts an overhead of the frame from the FHEC decoder, refers to the data length identifier and the flow identifier, computes from the data length identifier if the frame is not a frame for one of management and control, and holds a previously set data length if the frame is the frame for one of management and control, and in the case where the frame classification is an ATM cell, the frame length storer holds another previously set data length, and upon receiving a setting instruction signal from the status management section to the flow amount counter, the frame length storer sets the stored data length into the flow amount counter.

14. A transmission apparatus in a network, which connects a plurality of different client apparatuses, concentrates client data frames transferred from the client apparatuses to multiplex the same on a same carrier wave, separates the client data frames multiplexed on the same carrier wave, and transfers the client data frames to other client apparatuses, the transmission apparatus comprising:

input client data terminators, each being for terminating a client data frame other than an ATM from the client apparatus to detect a client data frame length and an attribute thereof;

client data buffers, each being for temporarily storing a client data frame from the input client data terminators;

frame overhead generators, each being for reading out data having a designated size from the client data buffer after generating an overhead of the frame based on a client data frame length and an attribute which are notified from the input client data terminators;

frame generators, each being for constituting the frame by combining the client data frame read out from the client data buffer and data transferred from the frame overhead generators;

first input buffers, each being for temporarily storing the frame transferred from the frame generators;

an ATM data terminator for terminating an ATM cell from an ATM client apparatus;

a second input buffer for temporarily storing an ATM cell transferred from the ATM data terminator;

receivers, each being for terminating a carrier wave having the frame and the ATM cell mixed;

frame extractors, each having a frame extraction circuit constitution according to claim 11 which separates signal row by one of the frame and the ATM cell;

third input buffers, each being for temporarily storing one of the frame and the ATM cell which are transferred from the frame extractors;

a scheduler for determining an output port with reference to the flow identifier transferred from each of the first, second and third input buffers and a connection identifier of the ATM cell and reading out one of the frame and the ATM cell from the input buffers in consideration of a priority and quality thereof;

a frame SW for exchanging the frame and the ATM cell which are transferred from the input buffers, the frame SW being controlled by the scheduler;

first, second and third output buffers for storing one of the frame and the ATM cell transferred from the frame SW;

frame adaptation sections, each being for accommodating the frame and the ATM cell which are transferred from the first output buffer;

transmitters, each being for transferring a signal from the frame adaptation section onto a carrier wave;

frame overhead terminators, each being terminating and deleting an overhead of the frame transferred from the second output buffer to form only a payload;

output client data terminators, each being for converting payload from the frame overhead terminator to transfer the converted client data frame to a client apparatus; and an output ATM data terminator for transferring an ATM cell from the third output buffer to an ATM client apparatus; and wherein said frame comprises:

a data length identifier indicating a data length;

a flow identifier indicating one of classification, quality and a channel of a client data traffic;

a frame header error check (FHEC) area for an area of n bytes from M plus 1-th byte, which stores a result Y having n bytes or less, the result Y being obtained by computing a numerical value X having the predetermined M bytes from a header by a predetermined coding method; and a payload area having a variable length, which stores client data frames.

15. A transmission apparatus according to claim 14, further comprising:

scramblers, each being for randomizing client data transferred from the client data buffer to transfer the randomized client data to the frame generator; and descramblers, each being for returning a signal row of the client data randomized by the scrambler, the signal row being transferred from the frame overhead terminators, into the original client data to transfer the returned client data to the input client data terminator.

16. A transmission apparatus according to claim 14, further comprising:

error detection redundancy adders, each being for adding a redundancy bit having a fixed length for error detection to an inputted client data frame; and error detectors, each being for detecting an error from data composed of inputted client data frame and a redundancy bit for error detection, and for deleting a redundancy bit for error detection, wherein the frame overhead generator counts an amount of redundancy bits as a payload length, and constitutes a data identifier of the frame according to claims 1.

17. A transmission apparatus according to claim 16, wherein each of the error detection redundancy adders is arranged between the client data buffers and the frame generators, and each of the error detectors is arranged between the frame overhead terminator and the input client data terminators.

18. A transmission apparatus according to claim 16, wherein, upon detecting an error, the error detector revises or discards one of the client data frame and the entire frame according to claim 1.

19. A transmission apparatus according to claim 16, wherein each of the error detection redundancy adders is arranged between the frame generator and the second input buffer, and each of the error detectors is arranged between the second output buffer and the frame overhead.

20. A transmission apparatus according to claim 14, further comprising:

client data frame splitter, each being for converting a data length into a numerical value of data lengths equal to a previously designated length or less to notify the converted numerical value to the frame overhead in the case where the data length notified from the client data terminator is longer than the previously designated length; and client data frame constructors, each being for temporarily storing a payload of the frame according to claims 1, and for returning split client data frame into an original client data frame in the case where the client data frame of the payload is split.

21. A transmission apparatus according to claim 20, wherein each of the client data frame splitter is arranged between the client data terminator and the frame overhead generator, and each of the client data frame constructors is arranged immediately before the input client data terminators.

22. A transmission apparatus according to claim 14, wherein, in the case where there do not exist one of the frame and the ATM cell which is transferred from the first output buffer, each of the frame adaptation sections constitutes the frame setting the payload length to zero.

* * * * *